United States Patent
Han et al.

(10) Patent No.: US 8,495,718 B2
(45) Date of Patent: Jul. 23, 2013

(54) AUTHENTICATION METHOD AND APPARATUS

(75) Inventors: Zhu Han, Beijing (CN); Liu Quiang, Beijing (CN); Huan Hao Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 12/892,599

(22) Filed: Sep. 28, 2010

(65) Prior Publication Data

US 2012/0079576 A1    Mar. 29, 2012

(30) Foreign Application Priority Data

Sep. 29, 2009 (CH) .......................... 2009 1 0175705

(51) Int. Cl.
*H04L 29/06* (2006.01)
(52) U.S. Cl.
USPC .......................... 726/7; 726/4; 726/5; 726/28
(58) Field of Classification Search
USPC ........................................................ 726/5–7
See application file for complete search history.

(56) References Cited

U.S. PATENT DOCUMENTS

| | | | |
|---|---|---|---|
| 5,710,884 A | 1/1998 | Dedrick | |
| 5,835,900 A | 11/1998 | Fagg, III et al. | |
| 5,878,423 A | 3/1999 | Anderson et al. | |
| 6,128,624 A | 10/2000 | Papierniak et al. | |
| 6,151,584 A | 11/2000 | Papierniak et al. | |
| 6,263,445 B1 | 7/2001 | Blumenau | |
| 6,978,270 B1 | 12/2005 | Carty et al. | |
| 7,231,657 B2 * | 6/2007 | Honarvar et al. | 726/2 |
| 7,318,191 B2 | 1/2008 | Kunzel | |
| 2003/0233546 A1 | 12/2003 | Blom | |
| 2004/0158551 A1 | 8/2004 | Santosuosso | |
| 2006/0117010 A1 | 6/2006 | Hakala | |
| 2006/0190736 A1 | 8/2006 | John et al. | |
| 2008/0127305 A1 | 5/2008 | Ross | |
| 2009/0049544 A1 | 2/2009 | Kashi | |

FOREIGN PATENT DOCUMENTS

EP        0976067 B1    1/2003

* cited by examiner

*Primary Examiner* — Jung Kim
*Assistant Examiner* — Ghodrat Jamshidi
(74) *Attorney, Agent, or Firm* — Yee & Associates, P.C.; Eustus D. Nelson

(57) ABSTRACT

An identity authentication method is provided. The method comprises obtaining records information of a valid user, where the records information indicates behaviors having been executed by the valid user; mapping, based on an orthogonal behavior model having multiple mutually orthogonal dimensions, records information to the multiple dimensions, wherein behaviors indicated by records information mapped to different dimensions do not overlap therebetween and have no logical cause and effect relationship; sampling records information mapped to different dimensions, respectively, so as to generate an authentication questionnaire including a plurality of authentication questions; computing, responsive to answers of a client to the authentication questionnaire, a total confidence P for the client being a valid user; outputting a positive authentication result, responsive to the total confidence probability P falling into a confidence interval; and outputting a negative authentication result, responsive to the total confidence probability P failing to fall into a confidence interval. The present invention further provides a corresponding identity authentication apparatus.

11 Claims, 2 Drawing Sheets

AUTHENTICATION METHOD AND APPARATUS

BACKGROUND

1. Field

The present invention relates to an authentication method and apparatus. In particular, the present invention relates to a method and apparatus for identity authentication in a network.

2. Description of the Related Art

In current web communities, games, electronic commerce, and other scenarios, security measures such as client identity authentication are always used to identify a valid user. In fact, the authentication process is a process of determining whether the authentication subject (client) is congruent with the declared identity (for example, a valid user).

Typically, in some online service systems, when clients apply for some particular service, they are always required to reserve some personal information data in the database, and then an authentication system will design questions or tests based on such personal information, so as to authenticate the clients' identities. A simple example is that in some website logon pages, a client is required to provide logon information such as a username and password, and if the username and password completely match, then the authentication system determines the valid identity of the current client. More complexly, the authentication system may ask, for example, through the web page, the client to answer one or more security questions about preserved personal information, for example, ID number, family address, telephone number, name of pet, etc., and authenticate the client's identity based on match degree between the answers and the reserved information.

The limitations for these authentication systems based on reserved information query firstly lie in their reliability and security. Since such sensitive information and static answers are limited in number and scope, potential criminals may easily embezzle such information and enter correct answers by some means to pretend to be a valid user. Thus, for web communities, games and electronic business scenarios which are highly demanding on reliability and security, such static, limited personal information-based question query systems are inappropriate.

Secondly, a reserved information query-based authentication system lacks flexibility of intelligently identifying a valid user. When answers entered by a client during the authentication process cannot exactly match the reserved information, the authentication system likely provides a negative authentication result. Even if the client per se is a valid user, he/she will be rejected due to inexact answers or wrong answer for any question. It compels a client to memorize a great quantity of reserved information for various kinds of network authentications, which imposes additional burden to the client.

Therefore, a new model identity authentication mechanism is desired to provide more reliable, much safer, and more flexible identity authentication to various kinds of service application environments.

SUMMARY

In order to overcome the problems existing in the prior art, the present invention provides an identity authentication solution based on user network behavior analysis, which supports provision of more reliable, much safer, and more flexible identity authentication to various kinds of service application environments by dynamically designing authentication questions and analyzing confidence interval.

According to a first aspect of the present invention, there is provided an identity authentication method, comprising: obtaining records information of a valid user, where the records information indicates behaviors having been executed by the valid user; mapping, based on an orthogonal behavior model having a plurality of mutually orthogonal dimensions, records information to the plurality of dimensions, wherein behaviors indicated by records information mapped to different dimensions do not overlap therebetween and have no logical cause and effect relationship; sampling records information mapped to different dimensions, respectively, so as to generate an authentication questionnaire including a plurality of authentication questions; and computing, responsive to answers of a client to the authentication questionnaire, a total confidence P for the client being a valid user, wherein $$P = 1 - \prod_{i=1 to N} (1 - p_i)$$

wherein, i indicates dimension index, N indicates the number of dimensions in the orthogonal behavior model, $p_i$ indicates a confidence probability of the authentication question from the ith dimension; responsive to the total confidence probability P falling into the confidence interval, a positive authentication result is output; and responsive to the total confidence probability P failing to fall into the confidence interval, a negative authentication result is output.

According to a second aspect of the present invention, there is provided an identity authentication apparatus, comprising: means for obtaining records information of a valid user, where the records information indicates behaviors having been executed by the valid user; means for mapping, based on an orthogonal behavior model having plurality of mutually orthogonal dimensions, records information to the plurality of dimensions, wherein behaviors indicated by records information mapped to different dimensions do not overlap therebetween and have no logical cause and effect relationship; means for sampling records information mapped to different dimensions, respectively, so as to generate an authentication questionnaire including a plurality of authentication questions; and means computing, responsive to answers of a client to the authentication questionnaire, a total confidence P for the client being a valid user, wherein $$P = 1 - \prod_{i=1 to N} (1 - p_i)$$

wherein, i indicates dimension index, N indicates the number of questions in the authentication questionnaire, $p_i$ indicates a confidence probability of the authentication question from the ith dimension; means for outputting, responsive to the total confidence probability P falling into the confidence interval, a positive authentication result; and means for outputting, responsive to the total confidence probability P failing to fall into the confidence interval, a negative authentication result.

Based on user network behavior analysis, the identity authentication solution according to the present invention can automatically use a great quantity of constantly produced records information which indicates isomeric facts, thereby guaranteeing that the confidence probability for each identity authentication is maintained at a higher level. Additionally, when using the records information indicating isomeric facts, the technical solution according to the present invention fully considers the confidence probability produced by different fact combinations, which can guarantee a sound orthogonality between the sampled records information and a low overlap degree of insiders, thereby improving security and reliability of identity authentication.

Further, the identity authentication solution according to the present invention also introduces the concept of confidence interval, whereby a client is not required to answer correctly all authentication questions during the authentication process, and as long as the answers of the client to authentication questions fall into the confidence interval, it can be determined that the client is a valid user, which improves flexibility of the authentication process.

BRIEF DESCRIPTION OF THE SEVERAL VIEWS OF THE DRAWINGS

Other objectives and effects of the present invention will become much clearer and more comprehensible through the following description with reference to the accompanying drawings and with more comprehensive understanding on the present invention, wherein.

In all of the above drawings, like reference signs indicate same, similar or corresponding features or functions.

DETAILED DESCRIPTION

The existing authentication mechanism is based on limited static information, which is easily embezzled by criminals to pass the authentication. However, a considerable number of "footprints," i.e., records information, will be generated in a database of a network when a user uses service applications such as games, electronic commerce, etc. Such records information is, for example, transaction records, event logs, or any other electronic records stored in a network database. Records information such as "footprints" is different between users and unique to each user. In particular, such records information will vary with change of network behaviors of the user. In other words, by leveraging records information of these dynamic changes, a particular user may be discriminated. Therefore, a major idea of the present invention is to authenticate a user's identity based on various records information left by the user in using a particular service.

For most service applications, user behavior will conform to a certain rule. For example, in some electronic commerce services, behaviors executable by a valid user require a transaction flow conforming to website regulations, which behaviors may comprise merchandise bidding, purchase, payment, comments, etc. For another example, in a web game service, behaviors executable by a valid user must also conform to a particular game setting rule, which behaviors may comprise virtual item trading, acquiring virtual properties such as treasures, arming, etc, and duels, etc. Records information for behaviors of a valid user in a network is all saved in the system. Similarly, records information of such effective user behaviors is also stored in a system of another service application. Since these records data can only be completely acquired by, for example, a service provider of a website and other users cannot access randomly, such records information can provide an authentication data basis for implementing the authentication solution of the present invention.

Figure 1:
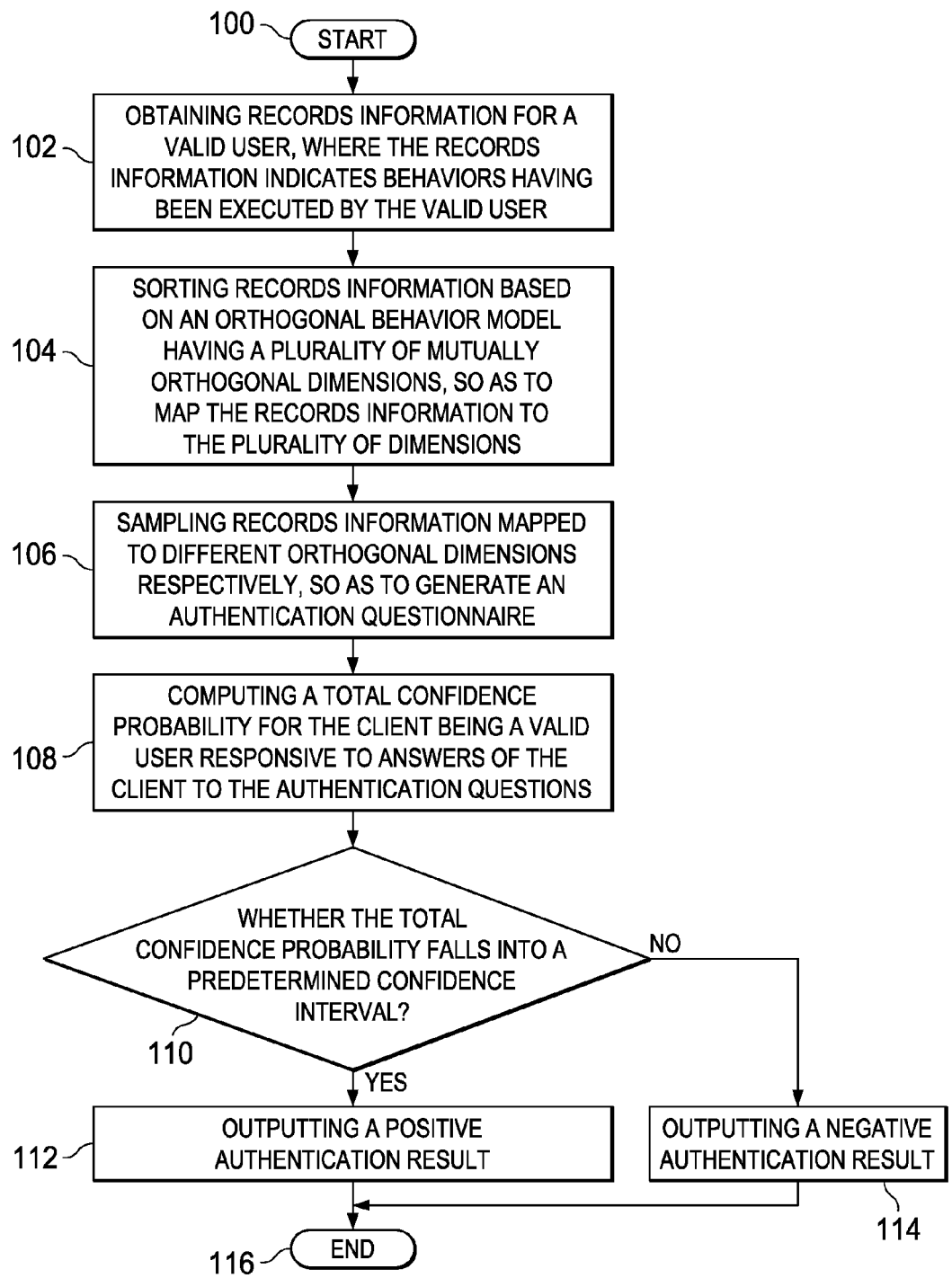
FIG. 1 shows a flow chart of an authentication method according to an embodiment of the present invention.

FIG. 1 shows a flow chart of an authentication method according to an embodiment of the present invention.

At step 100, an authentication process is initiated responsive to a client request or a service application request. Trigger of the authentication process may be accommodated to a security requirement of the service application. For example, in an application scenario of a web game service, if a client's account and password is embezzled by another person, in order to reclaim the client's own account and prove ownership of the original account, the client may request the service provider of the web game to perform user identity authentication, thereby triggering the authentication process. In an application scenario of electronic commerce or banking service which has a higher demand on security, when a large transaction occurs, the service provider may automatically activate identity authentication to the current client for the sake of security, thereby triggering the authentication process.

At step 102, records information of the valid user to whom the authentication process is directed is acquired, wherein the records information indicates behaviors having been executed by the valid user.

Typically, the service provider may record information about the valid user using the service through page operation information of the user, cookie, and log file, etc., and store it in a database. Therefore, it is easy for the service provider to implement acquisition of information indicating behaviors having been executed by the valid user.

At step 104, records information is sorted based on an orthogonal behavior model having a plurality of mutually orthogonal dimensions, so as to map the records information to the plurality of dimensions. Respective orthogonal dimensions indicate behavior types mutually uncorrelated in an application scenario of the service, and behaviors of different dimensions do not overlap therebetween and have no logical cause and effect relationship.

For a particular service application, an orthogonal behavior model having a plurality of mutually orthogonal dimensions may be predetermined through analyzing a user's potential behaviors.

For example, in some electronic commerce services, based on transaction flows as specified by the website, a valid user may execute behaviors such as merchandise bidding, purchase, payment, comments, etc, wherein behaviors of time nature (for example, the time of the user purchasing a merchandise, the time of the seller selling a merchandise, etc), behaviors of merchandise nature (for example, properties such as the brand, name, color, and etc., of the merchandise bought by the user), behaviors of transaction nature (for example, mode of payment adopted by the user in a transaction, payment account, closing price, discount rate, etc.), and behaviors of particular content (for example, special requirements of the user on a transaction, for example, claiming to return the merchandise, to change the merchandise, or to rework, etc.) are mutually orthogonal to different transactions, i.e., they do not overlap or have a logical cause and effect relationship. Therefore, these behavior types may be defined as dimensions of an orthogonal behavior model.

In some network game services, behaviors of each gaming role comprises virtual item transaction, acquiring virtual properties such as treasures, arming, and duels, etc. These behavior types belong to a limited set which have been defined by the system. The locations and timings for occurrence of a same behavior of each gaming role are different and uncorrelated. A behavior may be jointly participated in with one or more other roles. For example, some behaviors, for example rallying for a battle, have more participants simultaneously, and some behaviors, for example an arming transaction, only have few participants. In such application scenario, a plurality of behaviors executable by each role are orthogonal to one another, i.e., they do not overlap or have a logical cause and effect relationship, and they may be orthogonal dimensions of the orthogonal model. For example, in this example, the orthogonal dimensions may be transaction behavior, battling behavior, treasure hunting behavior, and trading behavior, etc.

Through the above specific example, those skilled in the art may understand that an orthogonal behavior model having a plurality of mutually orthogonal dimensions may be determined based on characteristics of a given service application. An orthogonal behavior model may be determined by defining a series of orthogonal dimensions in various manners, as long as the orthogonality between each dimension is guaranteed. In other words, there may have a plurality of applicable orthogonal behavior models for a same service application environment. For example, a series of orthogonal dimensions may also be defined dependent on attribute features of a behavior itself. In the above example of a network game service, for example, a series of dimensions may also be defined dependent on participants. Specifically, for a valid user A, all behaviors with simultaneous participation of users A, B, and C and all behaviors with simultaneous participation of A, D, and E are mutually orthogonal. Thus, in the technical solution according to the present invention, it is rather flexible in how to define an orthogonal behavior model having a plurality of mutually orthogonal dimensions for a given service application scenario.

According to an embodiment of the present invention, a same piece of records information may only be mapped to one dimension. However, since user behaviors reflected by records information generally have a plurality orthogonal attributes (for example, people, time, location, etc), according to another embodiment of the present invention, dependent on definition of a dimension, a piece of records information may be mapped to several different dimensions and participate in subsequent processing of the dimension it belongs to. However, those skilled in the art may understand, in this circumstance, a same attribute of a same piece of records information cannot be sampled repetitively and can only appear once in an authentication questionnaire as an authentication question, otherwise, it will affect the confidence probability of the authentication questionnaire.

At step 106, records information mapped to different orthogonal dimensions is sampled respectively, so as to generate an authentication questionnaire. Preferably, records information mapped to each orthogonal dimension is sampled respectively, so as to generate an authentication questionnaire.

Since in the authentication questionnaire each question corresponds to a different orthogonal dimension, questions in the authentication questionnaire and originating from different orthogonal dimensions are mutually uncorrelated.

Considering dimensions of an orthogonal behavior model is possible to be less than the number of required authentication questions, the present invention may allow sampling other records information mapped to a same dimension. It may be understood that records information mapped to a same dimension cannot mutually guarantee a complete orthogonality, thus in the subsequent processing, the influence of correlation between records information on the confidence degree should be considered, which will be explained later.

In one implementation, each orthogonal dimension may be sampled simultaneously, so as to generate a questionnaire having all authentication questions to present once-for-all to the client. In this circumstance, generation of questions in the questionnaire is static, which is irrelevant to the user's answers to the questions.

In a further preferred implementation, dependent on an answer of a user for a preceding authentication question, a dimension is dynamically sampled to generate a next authentication question. This dynamic authentication question generation manner helps to consider some other security policies so as to further guarantee reliability of the authentication process. The implementation process of such dynamic generation of authentication questions is similar to the process of dynamically generating test questions in a questions pool in consideration of a policy. For example, if an authentication question correctly answered by the client involves behavior A, while the behavior A has a unique characteristic, then generation of an authentication question for a behavior involving a same characteristic is prevented in a next dimension. Those skilled in the art may understand that an additional security policy can be further introduced in a process of dynamical generation of an authentication question, so as to further improve reliability of the authentication process.

Preferably, the authentication system may be configured therein with authentication question templates. Different question templates may be applied indiscriminately for different records information (user behaviors) to quiz the client. In fact, since records information has been sorted at step 102, it may be convenient to provide question templates for records information of each dimension. Questions for a same kind of behavior may use a same or limited several question sentences as a question template. For example, in the example of electronic commerce service, the following question may be used for a question template directed to behaviors of time nature: "in which of the following time points have you purchased X merchandise?" The time point in the records information is provided in one alternative answer, while false answers generated by the system are provided in other alternative answers. The following question may be used for a template directed to behaviors of merchandise nature: "when (which year, which month, which date) did you purchase which of the following merchandise?", and the merchandise in the records information is provided in one alternative answer, while false answers generated by the system are provided in other alternative answers. The following question may be used as a question template directed to behaviors of particular content: "which special requirement did you have in purchasing which merchandise on which year, which month, which date?", and a special requirement, for example, "return", in the records information is provided in one alternative answer, while false answers generated by the system are provided in other alternative answers. Since kinds of records information are typically limited, pre-configured question templates that also belong to a limited set.

Additionally, sampling records information may also consider other policies to order records information of different dimensions before the sampling step. In order to perform ordering, confidence probability weight w may be assigned respectively to, for example, behaviors indicated by records information mapped to different dimensions, and preferably, confidence probability weight w is assigned to behaviors indicated by records information mapped to each dimension, respectively. Assigning of confidence probability weight may at least consider various rules, including general rules and particular rules for service application scenarios. General rules, for example, may comprise: 1) occurrence frequency of the behavior in a service scenario, when the occurrence frequency is relatively high, a lower confidence probability weight is assigned, and when occurrence frequency is relatively low, a higher confidence probability weight is assigned; 2) the number of behavior participants, when the number of participants is relatively high, a lower confidence probability weight is assigned, and when the number of participants is relatively small, a higher confidence probability weight is assigned. Out of the consideration of confidence probability, records information of each dimension may be ordered individually or additionally based on their confidence probability weights as indexes, and then in sampling, records information with the highest confidence probability weight is preferably selected to generate an authentication question. If it is necessary to re-sample a same dimension, records information with the second highest confidence probability weight in the dimension may be selected based on the ordering result, to generate an authentication question, and so forth.

Out of the consideration of a client's memory on the past behaviors, first, ordering is performed to records information of each dimension with time as index, and then in sampling, the most recent records information in time is preferably selected to generate an authentication question. For further example, those skilled in the art may understand that, based on difference of service applications, another policy may be used to perform ordering for facilitating the following sampling step.

At step 108, responsive to answers of the client to the authentication questions, a total confidence probability P for the client being a valid user is computed, wherein $$P = 1 - \prod^{i=1 to N} (1 - p_i) \quad (1)$$

wherein i indicates dimension index, N indicates the number of dimensions in the orthogonal behavior model, and $p_i$ indicates a confidence probability of the authentication question from the ith dimension.

In an embodiment, the number of authentication questions is equal to the number N of the dimensions of the orthogonal behavior model, i.e., each question in the authentication questionnaire corresponds to a different orthogonal dimension, and then the confidence probability $p_i$ of the ith dimension is computed according to the following expression:

$$p_i = \begin{cases} w_i & \text{the client's answer to the authentication quest is correct} \\ 0 & \text{the client's answer to the authentication quest is wrong} \end{cases} \quad (2)$$

wherein $w_i$ indicates a confidence probability weight corresponding to the ith dimension, and putting $p_i$ into the expression (1), the total confidence probability P may be computed.

In another embodiment, the number of authentication questions is greater than the number of dimensions N of the orthogonal behavior model, i.e., there are more questions in the authentication questionnaire corresponding to a same dimension. Then, since records information within a same dimension has correlation, it is necessary to modify the confidence probability $p_i$ of the authentication question originating from records information of a same dimension.

For the kth question originating from the ith dimension, the modified confidence probability $p_{k'}$ needs to be determined based on $p_k$ and the confidence probability of the authentication question which has been previously sampled and originates from a same dimension.

$$p_{k'} = p_k - \sum^{j=1 to K-1} (1 - p_j) r_{jk} \quad (3)$$

and $$p_j = \begin{cases} w_j & \text{the client's answer to the authentication quest is correct} \\ 0 & \text{the client's answer to the authentication quest is wrong} \end{cases}$$

$$p_k = \begin{cases} w_k & \text{the client's answer to the authentication quest is correct} \\ 0 & \text{the client's answer to the authentication quest is wrong} \end{cases}$$

wherein $w_j$, $w_k$ are confidence probability weights corresponding to the jth and kth dimensions, respectively, wherein K indicates the number of authentication questions originating from a same dimension, $P_j$ indicates the confidence probability of the jth authentication question from an authentication question set of the previously sampled 1st to k−1th authentication questions originating from a same dimension; and $r_{jk}$ indicates the correlation between the jth authentication question and the current kth authentication question in the authentication question set originating from a same dimension.

If a plurality of questions is posed within a same dimension, the modified confidence probability $p_i$ of the last ith dimension is computed as:

$$p_i = 1 - \prod^{k'=1 to K} (1 - p_{k'}) \quad (4)$$

By putting $P_i$ as computed in expression (4) into expression (1), the total confidence probability P may be computed.

In fact, it can be seen from expressions (3) and (4) that, when the correlation between authentication questions is 0, expressions (3) and (4) are equivalent to expression (2). Those skilled in the art may understand that the former embodiment (only selecting one authentication question for each dimension) is in fact a special example in the latter embodiment (selecting one or more authentication questions in each dimension).

At step 110, a determination is made as to whether the total confidence probability P falls within a predetermined confidence interval.

If the total confidence probability P falls within the confidence interval, then at step 112, a positive authentication result is outputted, to determine that the identity of the client is the authenticated valid user.

If the total confidence probability P does not fall within the confidence interval, then at step 114, a negative authentication result is outputted.

At step 116, the authentication process ends.

Figure 2:
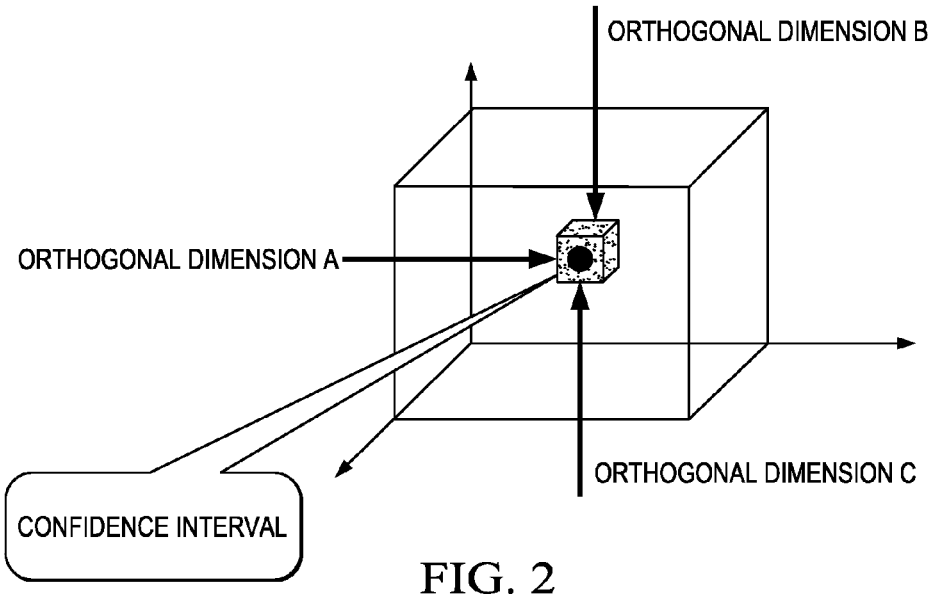
FIG. 2 shows a diagram of a confidence interval in an orthogonal behavior model.

FIG. 2 shows a diagram of a confidence interval in an orthogonal behavior model. In FIG. 2, the orthogonal behavior model comprises three mutually orthogonal dimensions A, B, and C. A point D in the orthogonal behavior model is determined through three orthogonal dimensions, representing a true behavior record of the valid user. The confidence interval is visually expressed as a cube surrounding point D in FIG. 2. Therefore, by virtue of the confidence interval, the client is not required to answer all authentication questions correctly during the authentication process. As long as answers of the client to the authentication questions fall within the confidence interval, it may be determined that the client is a valid user. Thus, it is unnecessary for the client to memorize a considerable number of answers during the authentication process, which alleviates the client's additional burden.

Figure 3:
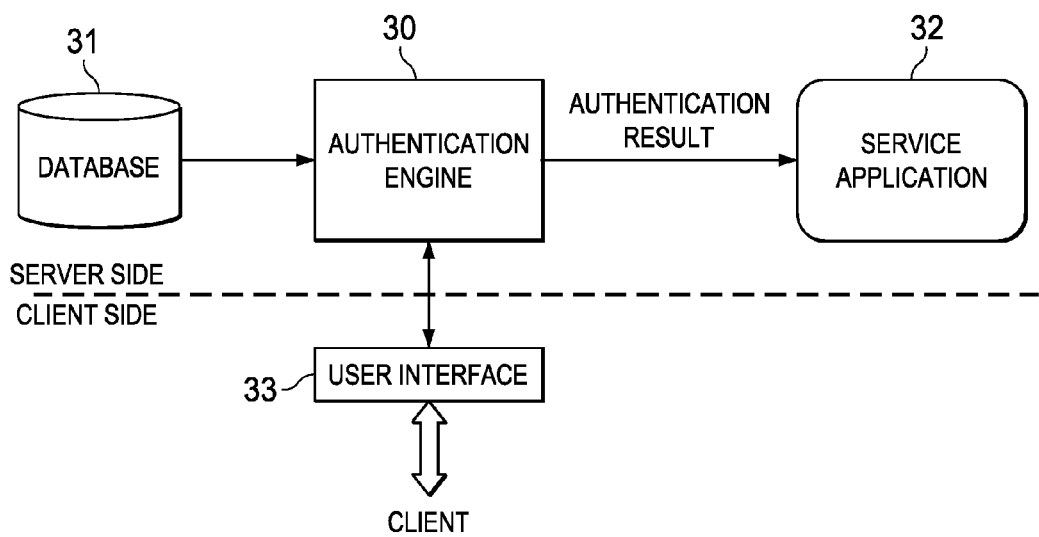
FIG. 3 shows an authentication system in which embodiments of the present invention are capable of being implemented.

FIG. 3 shows an authentication system in which embodiments of the present invention are capable of being implemented.

As shown in FIG. 3, an authentication engine 30 located at a server side is used to perform the authentication solution according to the present invention and to provide an authentication result to the service application 32; a database 31 stores records information regarding behaviors of a valid user, including, for example, affairs log, events log, or any other electronic records. A user interface 33 located at a client side for information interaction with the user may comprise various kinds of presentation means for presenting a text, graph, and audio information to the user and various kinds of input means for the user to input text, graph, and audio information.

An authentication engine 30, responsive to client request inputted from a user interface 33 or a request from the service application 32, initiates an authentication process.

Afterwards, the authentication engine 30 obtains from the database 31 records information directed to a valid user during the authentication process, wherein the records information indicates behaviors having been executed by the valid user.

Based on an orthogonal behavior model having a plurality of mutually orthogonal dimensions, the authentication engine 30 sorts the obtained records information so as to map the records information to the plurality of dimensions. For a particular service application 32, an orthogonal behavior model having a plurality of mutually orthogonal dimensions may be predetermined through analyzing the user's potential behaviors. An orthogonal behavior model may be determined by defining a series of orthogonal dimensions in various manners, as long as the orthogonality between each dimension is guaranteed.

The authentication engine 30 assigns a confidence probability weight w for a behavior indicated by records information mapped to each dimension. Assigning of a confidence probability weight may at least consider various rules, including general rules and particular rules for service application 32.

The authentication engine 30 samples records information mapped to each orthogonal dimension and generates an authentication questionnaire based on the sampling result. Questions in the authentication questionnaire may be generated once-for-all and presented to the client through the user interface 33, or may, responsive to interaction with the client via the user interface 33, sample a next orthogonal dimension dynamically dependent on the user's answer to a preceding authentication question, to generate a next authentication question. In one implementation, the authentication engine 30 may implement generation of authentication questions through configuring authentication question templates, wherein different question templates are applied indiscriminately for different records information (user behaviors) to quiz the client. The client enters answers to authentication questions via the user interface 33. Based on the client's answers, the authentication engine 30 computes the total confidence probability P for the client being valid user, wherein $$P = 1 - \prod^{i=1 to N} (1 - p_i), \quad (1)$$

wherein i indicates dimension index, N indicates the number of dimensions in the orthogonal behavior model, and $p_i$ indicates a confidence probability of the authentication question from the ith dimension.

If the number of authentication questions is equal to the number N of the dimensions of the orthogonal behavior model, i.e., each question in the authentication questionnaire corresponds to a different orthogonal dimension, then $$p_i = \begin{cases} w_i & \text{the client's answer to the authentication quest is correct} \\ 0 & \text{the client's answer to the authentication quest is wrong} \end{cases} \quad (2)$$

wherein $w_i$ indicates a confidence probability weight corresponding to the ith dimension, and when the authentication engine 30 puts $p_i$ into the expression (1), the total confidence probability P may be computed.

When the number of authentication questions is greater than the number N of the orthogonal behavior model, i.e., there are more than one question sampled within a same dimension, then since records information within a same dimension have correlation, the authentication engine 30 needs to modify the confidence probability $p_i$ of the authentication question originating from records information of a same dimension.

For the kth question originating from the ith dimension, the authentication engine 30 needs to determine the modified confidence probability $p_{k'}$ based on $p_k$ and the confidence probability of the authentication question, which has been previously sampled and originates from a same dimension.

$$p_{k'} = p_k - \sum^{j=1 to K-1} (1 - p_j) r_{jk} \quad (3)$$

and $$p_j = \begin{cases} w_j & \text{the client's answer to the authentication quest is correct} \\ 0 & \text{the client's answer to the authentication quest is wrong} \end{cases}$$

$$p_k = \begin{cases} w_k & \text{the client's answer to the authentication quest is correct} \\ 0 & \text{the client's answer to the authentication quest is wrong} \end{cases}$$

wherein $w_j$, $w_k$ are confidence probability weights corresponding to the jth and kth dimensions, respectively, wherein K indicates the number of authentication questions originating from a same dimension, $P_j$ indicates the confidence probability of the jth authentication question from an authentication question set of the previously sampled 1st to k−1th authentication questions originating from a same dimension; and $r_{jk}$ indicates the correlation between the jth authentication question and the current kth authentication question in the authentication question set originating from a same dimension.

The authentication engine 30 finally determines that the modified confidence probability $p_i$ of the ith dimension is:

$$p_i = 1 - \prod^{k'=1 to K} (1 - p_{k'}) \quad (4)$$

The authentication engine 30 puts the $p_i$ as computed in expression (4) in the expression (1), and then the total confidence probability P may be computed.

The authentication engine 30 determines whether the total confidence probability P falls within a predetermined confidence interval. If the total confidence probability P falls within the confidence interval, then a positive authentication result is outputted to the service application 32, to determine that the identity of the client is the authenticated valid user. If the total confidence probability P does not fall within the confidence interval, a negative authentication result is outputted to the service application 32, thereby rejecting the authentication request of the client.

Through the above description on the preferred embodiments, those skilled in the art will understand that the identity authentication solution according to the present invention is based on user network behavior analysis. With the valid user using a service application, records information left in the network's database will also be constantly updated. The identity authentication solution according to the present invention can automatically use a great quantity of constantly produced records information which indicates heterogeneous facts, thereby guaranteeing that the confidence probability for each identity authentication is maintained at a high level.

Additionally, when using the records information indicating heterogeneous facts, the technical solution according to the present invention fully considers the confidence probability produced by different fact combinations, which can guarantee a sound orthogonality between the sampled records information and a low overlap degree of insiders through flexibly selecting orthogonal dimensions and implementing various kinds of policies, thereby improving security and reliability of identity authentication. Further, the identity authentication solution according to the present invention, due to introduction of the concept of confidence interval, does not require a client to answer correctly all authentication questions during the authentication process, and as long as the answers of the client to authentication questions fall into the confidence interval, it can be determined that the client is a valid user.

The purpose for providing the description of the present invention is to explain and describe, not to exhaust or limit the present invention within the disclosed form. To a person of normal skill in the art, various modifications and alternations are obvious. Those skilled in the art may further understand that the method and apparatus in the embodiments of the present invention may be implemented through software, hardware, firmware, or their combination.

Thus, selecting and describing the preferred embodiments is to better illustrate the principle and practical application of the present invention and to enable a person of normal skill in the art to appreciate that without departing the spirit of the present invention, all modifications and alterations fall within the protection scope of the present invention as limited by the appending claims.

What is claimed is:

1. A method for authenticating an identity of a user, in response to a user request to access an online service, comprising:
   obtaining records information for a valid user, where the records information indicates behaviors having been executed by the valid user;
   mapping, based on an orthogonal behavior model having a plurality of mutually orthogonal dimensions, the records information to the plurality of mutually orthogonal dimensions;
   generating an authentication questionnaire including a plurality of authentication questions based on the records information;
   a computer system computing, responsive to answers of the user to the authentication questionnaire, a total confidence probability P for the user being the valid user, wherein the total confidence probability P is determined according to:

$$P = 1 - \prod^{i=1 to N} (1 - p_i)$$

wherein i indicates a dimension index, N indicates a number of dimensions in the orthogonal behavior model, and Pi indicates a confidence probability of the authentication questionnaire from the ith dimension;
   outputting a positive authentication result, responsive to the total confidence probability P falling into a confidence interval; and
   outputting a negative authentication result, responsive to the total confidence probability P failing to fall into the confidence interval.

2. The method according to claim 1, wherein for a particular service application, the orthogonal behavior model used when mapping the records information to the plurality of mutually orthogonal dimensions is determined by analyzing user behaviors when interacting with the particular service application.

3. The method according to claim 1, wherein the generating step comprises:
   sampling the records information mapped to different dimensions of the orthogonal behavior model, wherein each dimension of the different dimensions is sampled simultaneously so as to generate authentication questions of the authentication questionnaire.

4. The method according to claim 3, wherein the sampling step dynamically samples either a current dimension or a next dimension dependent on the user's answer to a preceding authentication question to generate a next authentication question.

5. The method according to claim 3, wherein the authentication question is generated according to the sampled records information based on a question template provided for the records information mapped to the different dimensions.

6. The method according to claim 3, wherein a confidence probability weight w is assigned to behaviors indicated by the records information mapped to the different dimensions.

7. The method according to claim 6, wherein the behaviors indicated by the records information mapped to the different dimensions do not overlap therebetween and have no logical cause and effect relationship with respect to one another.

8. The method according to claim 7, wherein assigning the confidence probability weight w is performed according to one of the following rules:
   1) occurrence frequency of a behavior indicated by the records information in a service scenario, wherein when the occurrence frequency is relatively high, a lower confidence probability weight is assigned, and when the occurrence frequency is relatively low, a higher confidence probability weight is assigned;

2) a number of behavior participants, wherein when the number of behavior participants is relatively high, a lower confidence probability weight is assigned, and when the number of behavior participants is relatively small, a higher confidence probability weight is assigned.

9. The method according to claim 7 further comprising:
ordering the records information of the different dimensions according to a policy before the sampling step; and
performing the sampling step based on the ordering result, wherein the policy comprises at least one item in the following group:
ordering with time as an index; and
ordering with the confidence probability weight w as an index.

10. The method according to claim 7, wherein:
if given ones of the authentication questions in the authentication questionnaire belong to the different dimensions, a confidence probability pi of an ith dimension is computed according to the following expression:

$$p_i = \begin{cases} w_i & \text{the client's answer to the authentication quest is correct} \\ 0 & \text{the client's answer to the authentication quest is wrong} \end{cases}$$

wherein wi indicates a confidence probability weight corresponding to the ith dimension.

11. A method for authenticating an identity of a user, in response to a request to access an online service, comprising:
obtaining records information for a valid user, where the records information indicates behaviors having been executed by the valid user;
mapping, based on an orthogonal behavior model having a plurality of mutually orthogonal dimensions, the records information to the plurality of mutually orthogonal dimensions, wherein the behaviors indicated by the records information mapped to the different dimensions do not overlap therebetween and have no logical cause and effect relationship with respect to one another;
generating an authentication questionnaire including a plurality of authentication questions based on the records information, wherein the generating step comprises sampling the records information mapped to different dimensions of the orthogonal behavior model, wherein each dimension of the different dimensions is sampled simultaneously so as to generate authentication questions of the authentication questionnaire;
a computer system computing, responsive to answers of the user to the authentication questionnaire, a total confidence probability P for the user being the valid user;
outputting a positive authentication result, responsive to the total confidence probability P falling into a confidence interval; and
outputting a negative authentication result, responsive to the total confidence probability P failing to fall into the confidence interval, wherein a confidence probability weight w is assigned to behaviors indicated by the records information mapped to the different dimensions, and wherein:
if given ones of the authentication questions in the authentication questionnaire belong to a same dimension, a modified confidence probability $p_{k'}$ of a kth question originating from the ith dimension is computed according to the following expression:

$$p_{k'} = p_k - \sum_{j=1 to K-1} (1-p_j)r_{jk}$$

and $$p_j = \begin{cases} w_j & \text{the client's answer to the authentication quest is correct} \\ 0 & \text{the client's answer to the authentication quest is wrong} \end{cases}$$

$$p_k = \begin{cases} w_k & \text{the client's answer to the authentication quest is correct} \\ 0 & \text{the client's answer to the authentication quest is wrong} \end{cases}$$

wherein $w_j$, $w_k$ are confidence probability weights corresponding to the jth and kth dimensions, respectively, wherein K indicates the number of authentication questions originating from a same dimension, $P_j$ indicates a confidence probability of the jth authentication question from an authentication question set of the previously sampled 1st to k−1th authentication questions originating from a same dimension; and $r_{jk}$ indicates a correlation between the jth authentication question and the current kth authentication question in the authentication question set originating from a same dimension; and
computing a confidence probability of the ith dimension according to the following expression:

$$p_i = 1 - \prod_{k'=1 to K} (1-p_{k'}).$$

* * * * *